Figure 1:
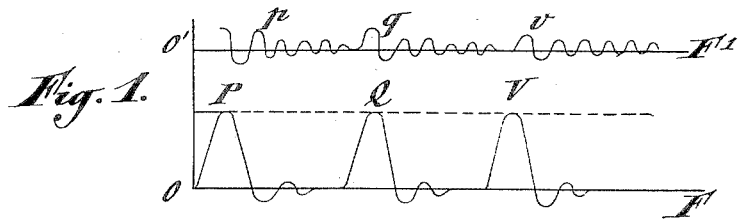

No. 783,923. PATENTED FEB. 28, 1905.
A. BLONDEL.
WIRELESS TELEGRAPHY BY ELECTRIC WAVES.
APPLICATION FILED DEC. 3, 1900.

2 SHEETS—SHEET 1.

Witnesses
Thomas Kirkpatrick
H. Van Heerenbrinck

Inventor
André Blondel
by Alexander & Co
Attorneys

No. 783,923. PATENTED FEB. 28, 1905.
A. BLONDEL.
WIRELESS TELEGRAPHY BY ELECTRIC WAVES.
APPLICATION FILED DEC. 3, 1900.
2 SHEETS—SHEET 2.
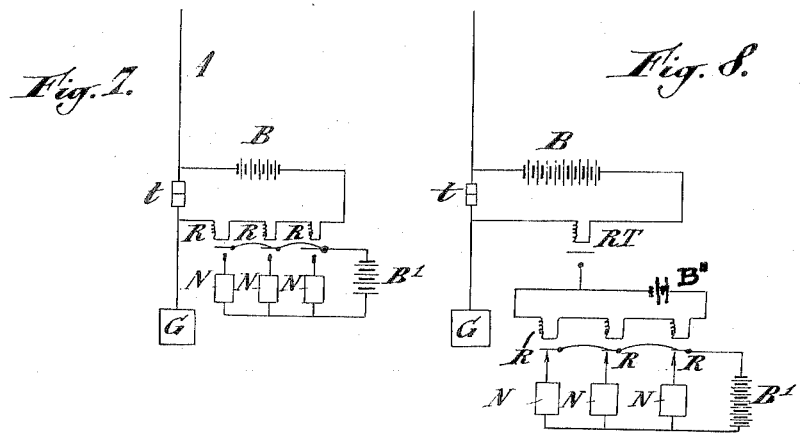
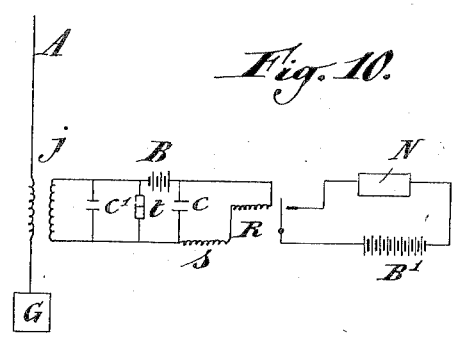
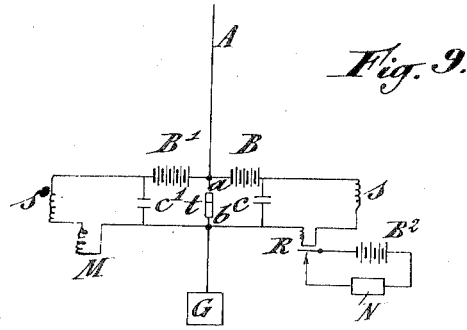
Witnesses
Thomas Kirkpatrick
H. Van Heerenbrinck
Inventor
André Blondel
by Alexander & Co
Attorneys No. 783,923. Patented February 28, 1905.

UNITED STATES PATENT OFFICE.

ANDRÉ BLONDEL, OF PARIS, FRANCE.

WIRELESS TELEGRAPHY BY ELECTRIC WAVES.

SPECIFICATION forming part of Letters Patent No. 783,923, dated February 28, 1905.

Application filed December 3, 1900. Serial No. 38,539.

*To all whom it may concern:*

Be it known that I, ANDRÉ BLONDEL, engineer, a citizen of France, residing at 41 Avenue de la Bourdonnais, Paris, in the French Republic, have invented new and useful Improvements in Wireless Telegraphy by Electric Waves; and I do hereby declare the following to be a full, clear, and exact description of the same.

My invention has reference to improvements in wireless telegraphy, the object being the selective reception at a given station of a signal or message transmitted from one of a number of transmitting-stations or the simultaneous selective reception at one station of two or more messages coming from two or more transmitting-stations.

Prior to my invention it has been attempted to accomplish the selective reception at a receiving-station of signals emitted at one of a number of distant transmitting-stations by electrically tuning the receiving mast-wire or the receiving-circuit in unison with the periodicity of the electromagnetic waves emitted at such transmitting-station. The difficulties encountered in such systems are now well recognized, and they can mainly be traced to the fact that it is practically impossible to obtain accurate syntony between two mast-wires because of the enormous frequency of the electromagnetic waves emitted by one and to be selectively absorbed by the other.

In accordance with my invention syntony between the transmitting and receiving mast-wires is not aimed at and is not utilized, and electrical tuning of any kind may be dispensed with in accordance with my invention.

The characteristic feature of the invention herein claimed is to mechanically tune the receiving apparatus in unison with the frequency of groups of electromagnetic waves emitted from a transmitting station or stations, whereby signals coming from different stations are mechanically and not electrically selected by the receiving apparatus, so that no electrical tuning of the receiving mast-wire or of the receiving-circuits becomes necessary, although such tuning, and particularly of the receiving-circuits, is not necessarily excluded.

In the following description instances of utilizing tuned receiving-circuits as adjuncts to acoustically-tuned receivers are indicated; but this forms no part of the invention herein claimed, since it has been made the subject of a divisional application, Serial No. 164,580, filed July 7, 1903.

Figure 2:
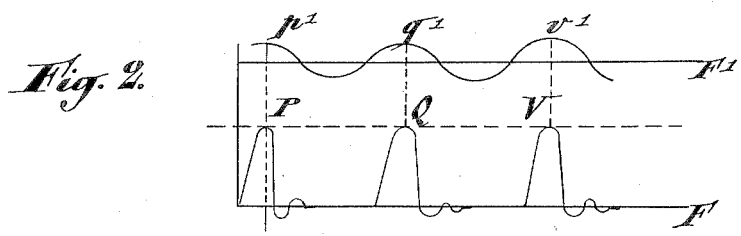
Figures 3, 4:
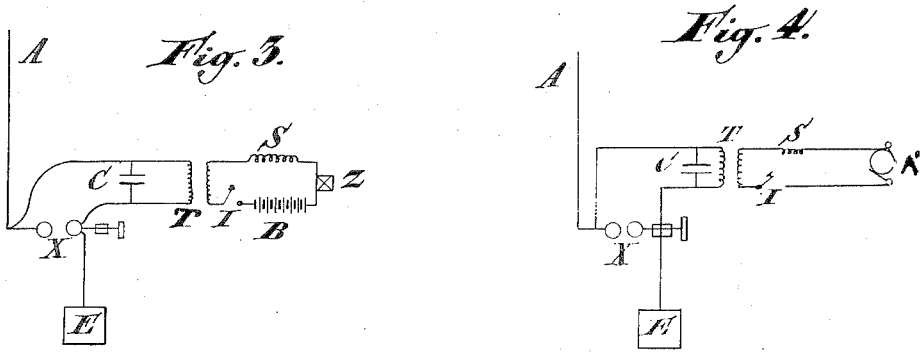

In the accompanying drawings, which form a part of this specification, my invention is illustrated as follows:

Figures 1 and 2 are diagrams illustrating the fundamental idea upon which my invention is based as distinguished from the fundamental idea which underlies the procedures heretofore attempted in wireless telegraphy. Figs. 3 and 4 are diagrams illustrating the equipment of transmitting-stations in accordance with my invention. Figs. 5, 6, 7, and 8 are diagrams illustrating various equipments of receiving-stations with acoustically-tuned receivers in accordance with my invention, and Figs. 9 and 10 are diagrams showing the use of electrically-tuned receiving-circuits in conjunction with acoustically-tuned receivers.

In Fig. 1 the curves P Q V indicate electric waves which are produced at the transmitting-station in any ordinary or improved manner by the charges and discharges of an oscillator of the Hertz type and which give rise to corresponding electromagnetic waves which proceed from the mast-wire. It will be seen that these waves occur in groups and that each group is composed of a number of waves which become very rapidly enfeebled, the first wave of each group being of comparatively great amplitude and the following waves of each group being rapidly reduced in amplitude by the dampening effects to which they are subjected, so that the periods between the successive discharges of the oscillator comprise intervals in which there are practically no waves emanating from the mast-wire, and these intervals of no oscillation form a large fraction of the period between two successive discharges. At the distant station the electromagnet waves arrive considerably weakened, but there they do not usually fade out altogether, but fill up the whole interval between the successive discharges. This is indicated in Fig. 1 by the curves *p q v*. The wave frequencies are extremely high, going into the millions per second, while the group frequencies, which correspond to the frequencies of the discharges at the transmitting-oscillator, are naturally very much lower.

Prior to my invention it was attempted to tune the mast-wire or the circuit at the receiving-station in unison with the wave frequency of one transmitting-station so as to receive and respond to such frequency and to receive and respond to no other frequency; but in accordance with my invention the receiving-station takes no selective notice of the wave frequency. It receives waves of all frequencies; but the receivers respond only to the group frequencies of such waves, making one movement or one vibration in response to each group of waves. This is indicated in the diagram Fig. 2, where P Q V again represent the waves corresponding to successive discharges of the transmitting-oscillator, and $p'$ $q'$ $v'$ represent the corresponding successive vibrations of a receiving apparatus—say a telephone-diaphragm or a vibrating reed—tuned to the frequency of the groups P Q V.

An essential requisite for the practice of my invention is that at the transmitting-stations there be a means for producing electrical discharges of the desired frequency or frequencies and that the discharges be disruptive as distinguished from discharges which merge into each other. It is within my invention to use any of the means afforded by the known arts to accomplish this result; but I have found the equipment diagrammatically indicated in Figs. 3 and 4 particularly effective. In Fig. 3 is shown an induction-coil T, in the primary of which is a battery B and any kind of automatic circuit-breaker of definite predetermined periodicity. The conventional device indicated at Z may represent such circuit-breaker, which may be either a rheotome of the kind ordinarily used in connection with Ruhmkorff coils or it may be an electrolytic circuit-breaker or a rotary circuit-breaker of any ordinary or improved kind. In this primary circuit there is a key I for closing and opening the circuit. The secondary circuit includes the two oscillator-balls X, set at the proper striking distance, which forms the spark-gap. From one of these oscillator-balls extends the mast-wire A and from the other the ground connection E. An arrangement of this kind has been found in practice to give rather poor results, since the discharges between the oscillator-balls are not distinctly and sharply disruptive, particularly when the periodicity of the circuit-breaker Z is high. It has been found in such cases that the discharges merge into each other and tend to form and maintain an electric arc. For the purposes of my invention the formation of an arc at the oscillator is inadmissible, and in order to prevent this I place in the secondary circuit a condenser C of suitable capacity in shunt around the spark-gap. If the interrupter Z is of the electrolytic type, its frequency can be adjusted at will by an inductance-coil S of suitable size included in the primary circuit or by properly choosing the number of cells in series for the battery B. The proper frequency is obtained by observing the rule that an increase of the number of cells in series or the diminution of the impedance of the circuit increases the frequency of the interruptions, and vice versa.

The arrangement indicated in Fig. 4 is similar to that in Fig. 3, except that in place of the interrupter Z and the battery B, I there use an alternating-current dynamo A'. The induction-coil or transformer T used in this arrangement is so chosen as to give an elevated potential in the secondary circuit—say anywhere from twenty-five thousand up to one hundred thousand volts. With such high potentials the condenser C must of course be properly constructed so as not to break down under the high pressure. By adjusting the speed and electromotive force of the alternator the inductance of the primary circuit by the self-inductance coil S and the capacity of the condenser C in the secondary circuit the number of discharges at the spark-gap can be adjusted to a nicety. If once the adjustment is made, the frequency of discharge at the spark-gap remains invariable.

I am not confined in the practice of my invention to the use of the identical arrangements for producing a definite frequency of discharges at the transmitting-stations. Any other well-known or improved means for obtaining this result may be used for this purpose. All that is required is that there be produced at each station a different but fixed number of electrical discharges. The range of frequencies practically available in my system is rather wide and depends largely upon the particular receiving apparatus used in a given case, as will be pointed out farther on.

Figures 5, 6:
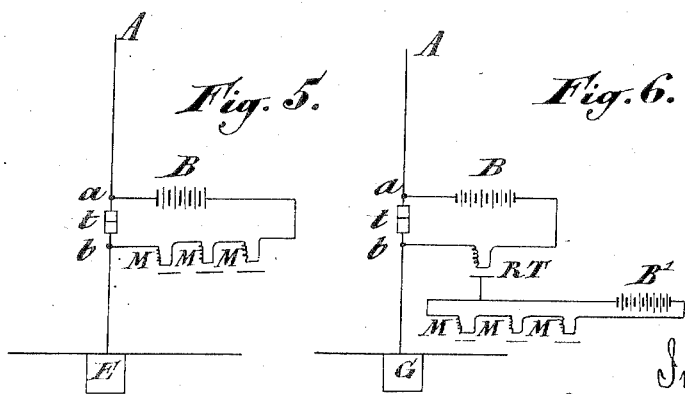

One equipment of a receiving-station is indicated in Fig. 5, where A is the mast-wire, E the ground, and $t$ a self-restoring coherer included in the mast-wire. This coherer may be of any of the well-known self-restoring types. In shunt around the coherer $t$ is the receiving-circuit $a$ B M $b$, containing the battery B and a number of differently-tuned monotelephones M M M—that is to say, telephones adjusted to selectively respond each to a different frequency of electrical impulses. Such monotelephones may be constructed in the manner set forth in United States Patent to Mercadier, No. 447,194, dated February 24, 1891, or in any other approved manner. I have here shown the monotelephones arranged in series in the local receiving-circuit; but they may just as well be arranged in multiple.

The equipment of the receiving-station (shown in Fig. 5) is adapted to work in conjunction either with one of three transmitting-stations, such as described with reference to Figs. 3 and 4, or in conjunction with three such stations simultaneously. Suppose three such stations be equipped and that the frequency of discharges produced at these stations be five hundred, seven hundred, and nine hundred, respectively. With such outlying transmitters the three monotelephones at the receiving-station must be adjusted to respond, respectively, to five hundred, seven hundred, and nine hundred electrical impulses per second—that is to say, while these monotelephones will receive any number of electrical impulses without selection they will respond audibly only to these frequencies and will emit musical notes corresponding to these frequencies. If now at the transmitting-station which has the frequency five hundred the Morse key I be operated, the mast-wire at that station will emit five hundred groups of electromagnetic waves per second. These groups of electromagnetic waves will be absorbed by the mast-wire of the receiving-station and the resistance of the self-restoring coherer will be varied with the frequency of the waves emitted at the transmitter, but in the manner indicated in Fig. 1 by the groups of waves $p\ q\ v$—that is to say, the resistance of the coherer, and consequently of the whole receiving-circuit, will be varied a vast number of times; but these variations themselves will periodically decrease and increase five hundred times per second, and variations of current in the receiver-circuit will likewise occur in a decreasing and increasing manner in five hundred groups per second. The single elementary variations of current which occur at the enormous rate of the wave frequency cannot affect any of the telephones in the circuit, and even if they could set the telephone-diaphragms into vibration these telephones could not emit a sound corresponding to that frequency, since this rate of vibration is far beyond the limits of audibility; but one of the telephones being tuned to the rate of five hundred per second will be acted upon by each group of current variation as by a single current impulse and will vibrate at that rate and emit a corresponding note. The other monotelephones will receive the same current impulses; but being tuned, respectively, to seven hundred and nine hundred vibrations per second they will emit no sound, or practically no sound. The message, therefore, which is sent from the station which is tuned to five hundred discharges per second will be selectively received and made audible by one of the three monotelephone-receivers at the receiving-station. Similarly a message sent from the transmitting-station tuned to seven hundred discharges per second will be selectively received by another monotelephone, and a message transmitted from the station which is tuned to nine hundred discharges per second will be selectively received by the third monotelephone. Similarly if two of the transmitting-stations simultaneously send messages, or if all the three transmitting-stations simultaneously sent messages, they will be selectively received each by one of the monotelephones.

It will be seen that the system is not limited to the use of three receivers, since a much greater number can be installed in the manner described, and each of them will selectively receive a message from one of the suitably-tuned transmitting-stations.

When monotelephones or tuned reeds are used as receivers and are designed to tell the message by the notes which they emit, the frequency of the discharges at the transmitters must evidently be below the frequency of acoustical vibrations which produce the highest still audible note, nor must the number of discharges at the transmitting-station have a lower periodicity than that which corresponds to acoustical vibrations which give the deepest still audible note.

The arrangement shown in Fig. 6 is similar to that shown in Fig. 5, except that the circuit which contains the self-restoring coherer $t$ and the battery B contains in this case the electromagnet of a microtelephonic relay R T of any ordinary or improved construction—such, for instance, as that shown in United States Patent to Mercadier and Pierquin, No. 622,629, dated April 4, 1899—while the monotelephones M M M are in a local circuit with a battery B', and which local circuit contains the microphonic element of the relay, so that the resistance of that circuit is varied in accordance with the incoming groups of electromagnetic waves which affect the coherer. The microtelephonic relay is of course not tuned, since it has to respond without selection to all group frequencies to which the monotelephones are tuned. An obvious variation of this arrangement would be to connect the circuit of the coherer with the local circuit containing the monotelephones by an induction-coil such as is used in ordinary telephony, and in this case the battery B' is of course omitted.

In the arrangements so far described the signals are received as musical notes of shorter and longer duration separated by intervals of silence in accordance with the manipulation of the key I of the transmitter, and in this manner messages in accordance with the Morse or any other code may be spelled out and received. If the Morse key is once depressed, and so long as it is kept depressed, the regularly-timed discharges at the spark-gap take place continuously, and a continuous series of groups of electromagnetic waves are transmitted and are received at one of the monotelephones, and the speaking of one such monotelephone would inform the receiving operator which of the transmitting-stations is now in communication with him; but he would receive no other intelligence. When, however, the transmitting-key is manipulated in accordance with a predetermined code—the Morse code, for instance—the correspondingly-tuned monotelephone responds to various numbers of groups of electromagnetic waves with intermissions of silence. In other words, by the conventional manipulation of the transmitting-key the primary groups of electromagnetic waves are assembled into short and long code groups, and the response of the monotelephone to such code groups spells out the message.

Instead of monotelephones other electromagnetic receiving apparatus, such as sounders or Morse recorders or any other kind of recorders, may be used. Such arrangement is illustrated in Fig. 7. In this case the circuit of the self-restoring coherer contains a series of relay-magnets R R R, and these act upon vibrating reeds which are differently tuned each in unison with one of the group frequencies of a corresponding number of outlying transmitting-stations. These vibrating reeds are in a local circuit of a battery B', which includes in multiple-arc branches the sounders or recorders N N N. Normally the reeds are so adjusted as to keep the multiple-arc branches all open; but if one of these reeds is set in vibration in response to a group frequency of electrical vibrations corresponding to the tuning of the reed then this reed vibrating with gradually-increasing amplitude will eventually close one of the multiple-arc branches, and thus operate one of the sounders or recorders. In the same manner two sounders or all the sounders or recorders may be operated simultaneously—that is to say, two or more messages may be received simultaneously. With this arrangement of receiving apparatus the group frequency—that is to say, the frequency of discharges at the transmitter—may be much smaller than in the case of monotelephone-receivers or in the case of any other kind of acoustical receivers, since the relay-reeds need not emit a musical note. It is therefore all sufficient if the number of discharges at the transmitter is sufficiently great to surely comprise one or two such discharges during the shortest closure of the transmitting-key. The destructive effects of sparks at the circuit-controlling reeds may be obviated in the usual manner by spark-shunting condensers, as is the practice with rheotomes in Ruhmkorff coils.

The arrangement illustrated in Fig. 8 is similar to that shown in Fig. 7, except that in this case the circuit of the self-restoring coherer contains an electromagnet of the microtelephonic relay R T, the microphonic element of this relay being in a separate local circuit of a battery B'', which contains in series the magnets of the relays R R R. The tuned reeds of these relays are in operative relation to their respective magnets and are in the local receiver-circuit of the battery B', containing the sounders or recorders N in normally open multiple branches, the same as in the apparatus shown in Fig. 7. Here again it will be understood that the microtelephonic relay is not tuned, since it has to respond to all group frequencies designed for reception at this station.

Mechanically-tuned receivers in circuits that are not electrically tuned as hereinbefore described are ordinarily all sufficient for selective or multiple telegraphy; but in some cases the selectivity of the receivers is rendered more pronounced when they are located in or controlled by electrically-tuned circuits, and the use of such electrically-tuned receiving-circuits as an aid to mechanically-tuned receiving apparatus comes within my invention and is illustrated in Figs. 9 and 10, although this improvement is not herein claimed, since it has been made the subject of a divisional application, Serial No. 164,580, filed July 7, 1903. In Fig. 9 the mast-wire A, grounded at G, and the self-restoring coherer $t$ are arranged as usual. The coherer is shunted at the points $a\ b$ by two circuits, one containing the battery B, the inductance-coil $s$, the relay-magnet R, and the condenser $c$ in shunt and the other containing the battery B', the inductance-coil $s'$, the monotelephone M, and the condenser $c'$ in shunt. These two circuits are only specimens, since more than two such circuits or only one such circuit may be thrown around the coherer. These branch circuits are tuned each to a different group frequency by the condensers and inductance-coils. As here shown, the relay-magnet R in one of these branch circuits controls a vibrating reed tuned in unison with the circuit of its controlling-magnet and itself controlling the local circuit of the battery $B^2$, containing any suitable electromagnetic receiver N, such as a sounder or recorder, while the other branch circuit operates the monotelephone M, tuned in unison with the branch circuit which controls it. In Fig. 10 the mast-wire does not contain the coherer, but contains the primary of a transformer $j$, the secondary of which is in a local circuit containing the coherer $t$ and a condenser $c'$ in shunt, and this condenser has such capacity as to tune this secondary circuit in unison with the wave frequency employed at the receiving-station in conjunction with which it is designed to work. Around the coherer $t$ is thrown a branch circuit containing a battery B, a relay-magnet R, an inductance-coil $s$, and a condenser $c$ in shunt. This branch circuit is tuned to the group frequency employed at the transmitting-station in conjunction with which it is designed to work, and the relay-magnet R controls a vibrating reed tuned to this group frequency and controlling the local circuit of the battery B', containing the sounder or recorder N. With this arrangement the primary of the inductorium $j$, which through the mast-wire receives without selection the waves of all frequencies employed at several transmitting-stations, transfers selectively to the tuned secondary circuit only the waves having the frequency employed at one of the transmitting-stations, varying the resistance of the coherer at this rate; but the branch thrown around the coherer and which contains the battery B being tuned to the group frequency of the aforesaid transmitting-station will receive electrical variations only at that frequency and will therefore act upon the reed of the relay R only at that rate—that is to say, at the same rate to which the reed itself is tuned. In this manner the selectivity of the reed becomes more pronounced, as will be readily understood. It will also be readily understood that in all receiving-stations like those shown in Figs. 5, 6, 7, and 8 the coherer can be taken from the mast-wire and placed in an independent local circuit which is only inductively connected with the mast-wire by a transformer in the manner indicated in Fig. 10.

From the foregoing description it will be seen that my invention comprises certain methods of operation, as well as the apparatus which I have here described for practicing the same. The methods are, however, not claimed herein, since the same have been made the subject of a divisional application, Serial No. 244,584, filed February 7, 1905.

What I here claim, and desire to secure by Letters Patent, is—

1. In a system of wireless telegraphy, a receiving-station containing an acoustically-tuned electromagnetic receiver, selectively actuated in accordance with a definite group frequency of electromagnetic waves absorbed at the station, substantially as described.

2. In a system of wireless telegraphy, a receiving-station equipped with a number of acoustically differently tuned electromagnetic receivers, selectively actuated each in accordance with a different group frequency of electromagnetic waves absorbed at the station, substantially as described.

3. In a system of wireless telegraphy, a receiving-station containing a monotelephonic receiver, selectively actuated in accordance with a definite group frequency of electromagnetic waves absorbed at the station, substantially as described.

4. In a system of wireless telegraphy, a receiving-station equipped with a number of differently-tuned monotelephonic receivers, selectively actuated each in accordance with a different group frequency of electromagnetic waves absorbed at the station, substantially as described.

5. In a system of wireless telegraphy, a receiving-circuit containing a self-restoring coherer, a battery and an electromagnetic device, selectively responsive to variations of current of one definite frequency, substantially as described.

6. In a system of wireless telegraphy, a receiving-circuit containing a self-restoring coherer, a battery and a number of electromagnetic devices, each selectively responsive to variations of current of a different frequency than the others, substantially as described.

7. In a system of wireless telegraphy, a receiving-station containing a mast-wire, a self-restoring coherer responsive to electromagnetic waves absorbed by the mast-wire, and an acoustically-tuned electromagnetic receiver, selectively actuated in accordance with a particular group frequency of the electromagnetic waves absorbed by the mast-wire, substantially as described.

8. In a system of wireless telegraphy, a receiving-station containing a mast-wire, a self-restoring coherer responsive to electromagnetic waves absorbed by the mast-wire, and a number of acoustically differently tuned electromagnetic receivers, selectively actuated each in accordance with a different group frequency of the electromagnetic waves absorbed by the mast-wire, substantially as described.

9. In a system of wireless telegraphy, a receiving-station containing in its equipment a number of acoustically differently tuned electromagnetic receiving devices, each selectively responsive to electrical variations of a different frequency, a relay or relays controlling the receivers and controlled by groups of electromagnetic waves absorbed at the station, substantially as described.

10. A system of multiple wireless telegraphy comprising a number of transmitters each provided with means for producing a different number of groups of electromagnetic waves in the unit of time, a receiving-station provided with a mast-wire for absorbing the transmitted waves, and two or more signal-receiving apparatus, each mechanically tuned to a different pitch so as to be responsive to one only of the differently-rated groups absorbed by the mast-wire, substantially as described.

11. A system of multiple wireless telegraphy, comprising a number of transmitters each provided with means for producing a different number of groups of electromagnetic waves in the unit of time and each provided with a Morse key or equivalent device for breaking the groups of electromagnetic waves up into code groups, a receiving-station provided with a mast-wire for absorbing the transmitted waves, and two or more signal-receiving apparatus, each mechanically tuned to a different pitch so as to be responsive to one only of the differently-rated groups absorbed by the mast-wire, substantially as described.

In testimony whereof I have signed this specification in the presence of two subscribing witnesses.

ANDRÉ BLONDEL.

Witnesses:
   AUGUSTE BAINVILLE,
   HIPPOLYTE BLONDEL.